(12) United States Patent
Oan

(10) Patent No.: US 8,189,137 B2
(45) Date of Patent: May 29, 2012

(54) BACKLIGHT UNIT AND LIQUID CRYSTAL DISPLAY DEVICE HAVING THE SAME

(75) Inventor: Seo Chung Oan, Busan (KR)

(73) Assignee: LG Display Co. Ltd., Seoul (KR)

( * ) Notice: Subject to any disclaimer, the term of this patent is extended or adjusted under 35 U.S.C. 154(b) by 329 days.

(21) Appl. No.: 12/560,653

(22) Filed: Sep. 16, 2009

(65) Prior Publication Data

US 2010/0208159 A1   Aug. 19, 2010

(30) Foreign Application Priority Data

Feb. 18, 2009   (KR) .................. 10-2009-0013457

(51) Int. Cl.
*G02F 1/1335* (2006.01)
*G02F 1/1333* (2006.01)

(52) U.S. Cl. ............................... 349/65; 349/58

(58) Field of Classification Search .............. 349/58–60, 349/65
See application file for complete search history.

(56) References Cited

U.S. PATENT DOCUMENTS

| 7,578,610 B2 * | 8/2009 | Sakamoto et al. ............ 362/634 |
| 2006/0256254 A1 * | 11/2006 | Park et al. ........................ 349/65 |
| 2008/0225203 A1 * | 9/2008 | Kim ................................ 349/65 |

* cited by examiner

*Primary Examiner* — Mark Robinson
*Assistant Examiner* — Michael Inadomi
(74) *Attorney, Agent, or Firm* — Brinks Hofer Gilson & Lione

(57) ABSTRACT

A backlight unit adapted to improve uneven brightness and reliability is disclosed. The backlight unit includes: a bottom cover; at least one metal PCB disposed on one side surface of the inner side of the bottom cover; a plurality of light emission diodes arranged at a fixed interval on the metal PCB; and at least one fixing protrusion projecting from an upper surface of the metal PCB and fastened to a panel guide which is combined with the bottom cover, in order to prevent the metal PCB from separating.

10 Claims, 3 Drawing Sheets

BACKLIGHT UNIT AND LIQUID CRYSTAL DISPLAY DEVICE HAVING THE SAME

This application claims the benefit of Korea Patent Application No. 10-2009-0013457 filed on Feb. 18, 2009, the entire contents of which is incorporated herein by reference for all purposes as if fully set forth herein.

BACKGROUND

1. Field of the Invention

This disclosure relates to a backlight unit, and more particularly, to a backlight unit adapted to improve uneven brightness and reliability, as well as a liquid crystal display device having the same.

2. Discussion of the Related Art

The fields to which liquid crystal display (LCD) devices are being applied are growing because of desirable features such as light weight, slimness, and a low driving voltage. This trend is confirmed in the ways in which the LCD devices have been applied to office automation equipment, audio equipment, video equipment, and so on. An LCD device controls the amount of light being transmitted on the basis of image signals applied to a plurality of control switches, in order to display a picture.

The LCD device, which is not self-luminescent, includes a backlight unit irradiating light on the rear surface of an LCD panel on which a picture is displayed. The backlight unit is classified as either of an edge type or a direct type in accordance with the placement of its light source.

Edge type backlight units have been applied to small and medium sized LCD devices. An edge type backlight unit includes a light source which is positioned at one its edges and a light guide panel guiding the light to be irradiated to the entire surface of the LCD panel.

On the other hand, direct type backlight units have been applied to larger LCD devices namely those above 12 inches. A direct type backlight unit includes a plurality of light sources arranged opposite the rear surface of the LCD panel. These plural light sources directly apply light to the rear surface of the LCD panel.

Electro-luminescent lamps (ELs), Cold cathode fluorescent lamps (CCFLs), hot cathode fluorescent lamps (HCFLs), or light emitting diodes (LEDs) are used as the light source of a general backlight unit. Among these light sources, LEDs have such as slimness, superior color reproduction, and low power consumption. The other light sources (i.e., the lamps) are configured to include a noxious heavy metal like mercury. As such LEDs have recently been increasingly used compared with other light sources.

The LED used in a related art backlight unit generates high heat. Due to this, the LED is loaded on a metal printed-circuit-board (PCB). Actually, an edge type backlight unit of the related art includes a metal PCB loaded with the LEDs. The metal PCB is fastened to one inner edge of a bottom cover of the edge type backlight unit by an adhesive.

However, in the edge type backlight unit of the related art, the metal PCB is separated from the bottom cover by heat generated when the LEDs are driven, thereby causing a misalignment of the LEDs. Accordingly, light leakage, a lack of uniform brightness, and other defects can be generated.

In addition, the edge type backlight of the related art can cause a light guide plate disposed parallel to the LEDs to be damaged by the separation of the metal PCB. As such, a malfunction occurs in the LCD device.

BRIEF SUMMARY

A backlight unit includes: a bottom cover; at least one metal PCB disposed on one side surface of the inner side of the bottom cover; a plurality of light emission diodes arranged at a fixed interval on the metal PCB; and at least one fixing protrusion projecting from an upper surface of the metal PCB and fastened to a panel guide which is combined with the bottom cover, in order to prevent the metal PCB from separating.

An LCD device according to another aspect of the present disclosure includes: a bottom cover; at least one metal PCB disposed along one edge of the inner side of the bottom cover; a plurality of light emission diodes arranged at a fixed interval on the metal PCB; a panel guide combined with the bottom cover; at least one fixing protrusion projected from an upper surface of the metal PCB and fastened at a panel guide in order to prevent the metal PCB from separating; and a liquid crystal display panel disposed on the panel guide.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims. Nothing in this section should be taken as a limitation on those claims. Further aspects and advantages are discussed below in conjunction with the embodiments. It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the embodiments and are incorporated in and constitute a part of this application, illustrate embodiment(s) of the invention and together with the description serve to explain the disclosure. In the drawings.

DETAILED DESCRIPTION OF THE DRAWINGS AND THE PRESENTLY PREFERRED EMBODIMENTS

Figure 1:
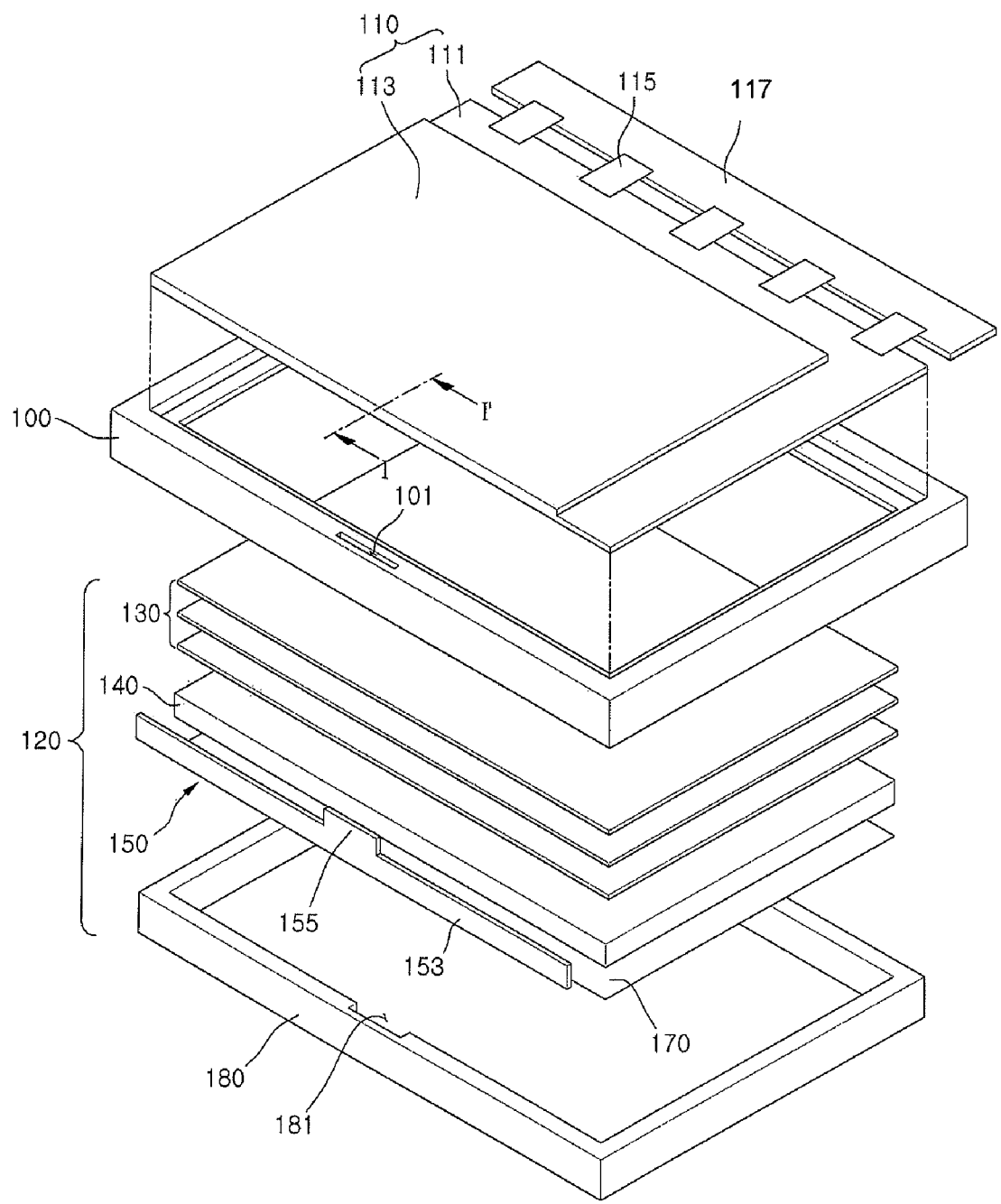
FIG. 1 is an exploded perspective view showing an LCD device which includes an edge type backlight unit according to a first embodiment of the present disclosure.

Reference will now be made in detail to the embodiments of the present disclosure, examples of which are illustrated in the accompanying drawings. These embodiments introduced hereinafter are provided as examples in order to convey their spirits to the ordinary skilled person in the art. Therefore, these embodiments might be embodied in a different shape, so are not limited to these embodiments described here. Also, the size and thickness of the device might be expressed to be exaggerated for the sake of convenience in the drawings. Wherever possible, the same reference numbers will be used throughout this disclosure including the drawings to refer to the same or like parts.

Figure 2:
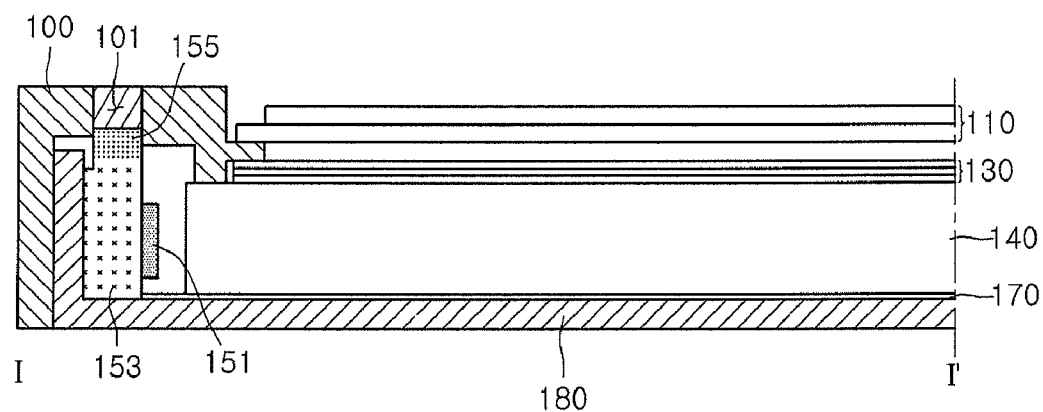
FIG. 2 is a cross-sectional view of the LCD device taken along the line I-I' shown in FIG. 1.
Figure 3:
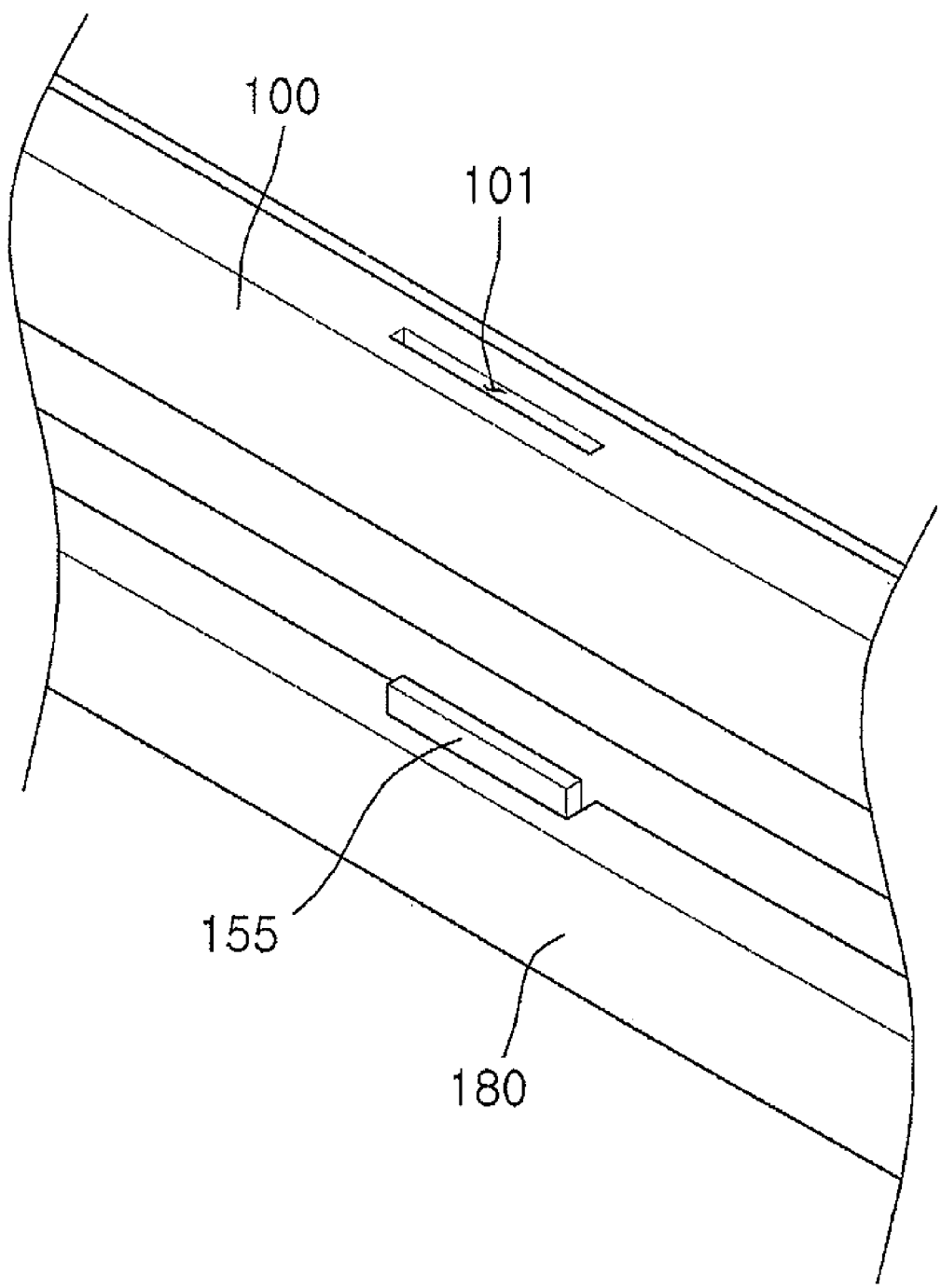
FIG. 3 is a perspective view showing a combined configuration of the panel guider, the metal PCB, and the bottom cover which are shown in FIG. 1.

FIG. 1 is an exploded perspective view showing an LCD device which includes an edge type backlight unit according to a first embodiment of the present disclosure. FIG. 2 is a cross-sectional view of the LCD device taken along the line I-I' shown in FIG. 1. FIG. 3 is a perspective view showing a combined configuration of the panel guider, the metal PCB, and the bottom cover which are shown in FIG. 1.

Referring to FIGS. 1 and 3, an LCD device according to an embodiment of the present disclosure includes an LCD panel 110 for displaying an image, a backlight unit 120 disposed on the rear surface of the LCD panel 110 and providing light to the LCD panel 110, and a panel guide 100 combined with the backlight unit 120 to support the edge of the LCD panel 110.

The LCD panel 110 includes a thin film transistor (TFT) substrate 111 and a color filter substrate 113 which are combined to face each other and between which a uniform cell gap is maintained, as well as a liquid crystal layer (not shown) interposed between the two substrates.

Although they are not shown in detail in the drawings, the TFT substrate 111 and the color filter substrate 113 will now be explained in more detail. The TFT substrate 111 includes a plurality of pixels defined by the crossing of a plurality of gate lines and a plurality of data lines, as well as a TFT formed at each intersection of the gate and data lines. The TFT is connected to a pixel electrode formed within each of the pixels. The color filter substrate 113 includes color filters opposite each of the respective pixels, a black matrix rimmed around each color filter and screening the gate and data lines and the TFTs, and a common electrode covering all of the color filters and the black matrix. The color filters include red (R), green (G), and blue (B) filters.

An LCD panel driving unit 117 is disposed on one side of the LCD panel 110. The LCD panel driving unit 117 is connected to the gate and data lines on the LCD panel 110. This driving unit 117 applies scan and data signals to each of the gate and data lines. To this end, the LCD panel driving unit 117 is electrically connected to the LCD panel 110 by means of taps 115 each formed in a tape carrier package (TCP).

The backlight unit 120 for applying light to the LCD panel 110 includes a bottom cover 180 opened upward, a metal PCB 150 disposed on one edge of the inner side of the bottom cover 180, a plurality of LEDs 151 mounted on the metal PCB 150, a light guide plate 140 disposed parallel to the plurality of LEDs 151 and configured to convert dot lights incident from the LEDs 151 into two-dimensional light, optical sheets 130 disposed on the light guide plate 140 and configured to converge and diffuse light, and a reflective sheet 170 disposed under the light guide plate 140. The reflective sheet 170 reflects light progressing downwardly from the light guide plate 140 toward the LCD panel 110.

For the convenience of explanation, the backlight unit 120 is described as a component separated from the panel guide 100. However, the panel guide 100 is combined with the bottom cover 180 and allows the backlight unit 120 to become a single module. In view of this point, the panel guide 100 can be included in the configuration of the backlight unit 120.

The light guide plate 140 is formed of poly methyl methacrylate (PMMA). Also, the light guide plate 140 has a wedge shape which becomes thinner the further away it is from its incident face opposite to the LEDs 151, even though this is not shown in detail in the drawings. Furthermore, a prism pattern (not shown) can be formed on the rear surface of the light guide plate 140. The prism pattern refracts incident light toward the optical sheets 130.

The optical sheets 130 include a diffusion sheet for diffusing light, a convergent sheet for converging light, and a protective sheet for protecting the diffusion and the convergent sheets.

The plurality of LEDs 151 can be configured to include a plurality of white LEDs each emitting white (W) light. Alternatively, the plurality of LEDs 151 can be configured to include a combination of red (R), green (G), and blue (B) LEDs emitting red (R), green (G), and blue (B) lights. In other words, the plurality of LEDs 151 is not limited to white LEDs.

The metal PCB 150 includes a body portion 153 of a bar shape and a fixing protrusion 155 formed on an upper surface of the body portion 153. The fixing protrusion 155 is configured to project from the center of the body portion 153 toward the panel guide 100. As such, the fixing protrusion 155 and the body portion 153 may be formed to be a unified manner.

One side surface of the bottom cover 180 opposite to the metal PCB 150 has a sectional structure of a "⊏" shape. The bottom cover 180 is provided with a reception recess 181 formed opposite to the fixing protrusion 155. The reception recess 181 guides the fixing protrusion 155 to project toward the panel guide 100 and simultaneously prevents the movement of the metal PCB 150 in a lengthwise direction.

The panel guide 100 is formed using a mold of a rectangular rim. The side walls of the panel guide 100 are combined with the bottom cover 180. A reception hole 101 is formed in the panel guide 100 opposite to the fixing protrusion 155. The reception hole 101 is formed in the same shape as the fixing protrusion 155, allowing the fixing protrusion 155 to pass through it. The reception hole 101 may be formed simultaneously with the manufacturing process of the panel guide 100.

The backlight unit 120 according to an embodiment of the present disclosure fastens the metal PCB 150 along one side surface of the inner side of the bottom cover 180 so that the fixing protrusion 155 of the metal PCB 150 is placed into the reception recess 181 of the bottom cover 180. The fixing protrusion 155 placed into the reception recess 181 passes through the reception hole 101 of the panel guide 100. The panel guide 100 is combined with the bottom cover 180. Before the combination of the panel guide 100 and the bottom cover 180, the reflective sheet 170, the light guide plate 140, and the optical sheets 130 are sequentially disposed the bottom cover 170. In this way, the backlight unit 120 is assembled into a product.

The backlight unit 120 of the present embodiment is explained as having a configuration such that the metal PCB 150 is disposed along one side surface of the inner side of the bottom cover 180, but it is not limited to this. In other words, the backlight unit 120 can be configured to include metal PCBs disposed on opposing side surfaces or along all sides of the inner side of the bottom cover 180. The backlight unit 120 can include at least one metal PCBs.

Also, the backlight unit 120 of the present embodiment is explained to have a configuration such that only one fixing protrusion 155 projects upwardly from the center of the metal PCB 150, but also it is not limited to this. For example, the backlight unit 120 can be configured to include a plurality of fixing protrusions formed on the upper surface of the metal PCB 150. In this case, a plurality of reception recesses and a plurality of reception holes opposite to the fixing protrusions can be formed in the panel guide 100 and the bottom cover 180, respectively.

As described above, in the LCD device including the backlight unit 120 according to an embodiment of the present disclosure, the metal PCB 150 is firstly fastened to one side surface of the inner side of the bottom cover 180 by an adhesive. The metal PCB 150 is secondarily fastened by placing the fixing protrusion 155 into the reception recess 181 of the bottom cover 180. In addition, the metal PCB 150 is thirdly fastened by passing (or inserting) the fixing protrusion 155 through (or into) the reception hole 101 of the panel guide 100. As such, the backlight unit 120 of the present embodiment can prevent the separation of the metal PCB which occurred in the edge type backlight unit of the related art.

Therefore, the LCD device can prevent light leakage, uneven brightness, and damage of the light guide plate 140, all of which may be caused by the separation of the metal PCB 150. As a result, a malfunction of the LCD device can be prevented.

Although the present disclosure has been limitedly explained regarding only the embodiments described above, it should be understood by the ordinary skilled person in the art that the present disclosure is not limited to these embodiments, but rather that various changes or modifications thereof are possible without departing from the spirit of the present disclosure. Accordingly, the scope of the present disclosure shall be determined only by the appended claims and their equivalents.

The invention claimed is:

1. A backlight unit comprising:
   a bottom cover;
   at least one metal PCB disposed on one side surface of the inner side of the bottom cover;
   a plurality of light emission diodes arranged at a fixed interval on the metal PCB; and
   at least one fixing protrusion projecting from an upper surface of the metal PCB and fastened to a panel guide, which is combined with the bottom cover, in order to prevent the metal PCB from separating.

2. The backlight unit according to claim 1, wherein the panel guide is provided with at least one reception hole on the panel guide opposite to the fixing protrusion and fixedly receives the fixing protrusion.

3. The backlight unit according to claim 2, wherein the reception hole has the same shape as the fixing protrusion.

4. The backlight unit according to claim 1, wherein the bottom cover is provided with at least one reception recess opposite to the at least one fixing protrusion.

5. The backlight unit according to claim 4, wherein the reception recess encompasses outer surfaces of the fixing protrusion.

6. A liquid crystal display device comprising:
   a bottom cover;
   at least one metal PCB disposed on one edge of the inner side of the bottom cover;
   a plurality of light emission diodes arranged at a fixed interval on the metal PCB;
   at least one fixing protrusion projected from an upper surface of the metal PCB and fastened at a panel guide, which is combined with the bottom cover, in order to prevent the metal PCB from separating; and
   a liquid crystal display panel disposed on the panel guide.

7. The liquid crystal display device according to claim 6, wherein the panel guide is provided with at least one reception hole on the panel guide opposite to the fixing protrusion and fixedly receives the fixing protrusion.

8. The liquid crystal display device according to claim 7, wherein the reception hole has the same shape as the fixing protrusion.

9. The liquid crystal display device according to claim 7, wherein the bottom cover is provided with at least one reception recess opposite to the at least one fixing protrusion.

10. The liquid crystal display device according to claim 9, wherein the reception recess encompasses outer surfaces of the fixing protrusion.

* * * * *